United States Patent [19]
Rau

[11] Patent Number: 5,515,370
[45] Date of Patent: May 7, 1996

[54] CIRCUIT ARRANGEMENT FOR LINE UNITS OF AN ATM SWITCHING EQUIPMENT

[75] Inventor: Peter Rau, Munich, Germany

[73] Assignee: Siemens Aktiengesellschaft, Munich, Germany

[21] Appl. No.: 400,955

[22] Filed: Mar. 8, 1995

[30] Foreign Application Priority Data

Mar. 31, 1994 [DE] Germany ............... 44 11 377.3

[51] Int. Cl.⁶ .................. H04J 3/24; H04L 12/56
[52] U.S. Cl. ............ 370/60.1; 370/85.6; 370/94.2
[58] Field of Search .................. 370/58.1, 58.2, 370/58.3, 60, 60.1, 61, 85.6, 94.1, 94.2

[56] References Cited

U.S. PATENT DOCUMENTS

| | | | |
|---|---|---|---|
| 5,084,867 | 1/1992 | Tachibana et al. | 370/60 |
| 5,119,369 | 6/1992 | Tanabe et al. | 370/60 |
| 5,200,950 | 4/1993 | Foglar et al. | 370/60.1 |
| 5,287,348 | 2/1994 | Schmidt et al. | 370/60.1 |
| 5,339,318 | 8/1994 | Tanaka et al. | 370/58.2 |
| 5,432,777 | 7/1995 | Le Boudec | 370/60 |

FOREIGN PATENT DOCUMENTS

0500238A1  8/1992  European Pat. Off. .

*Primary Examiner*—Alpus Hsu
*Attorney, Agent, or Firm*—Hill, Steadman & Simpson

[57] ABSTRACT

In a circuit arrangement for line units of an ATM switching equipment unit, it is possible with the assistance of the respective line unit to separate one or more virtual connections carried in a virtual path proceeding thereover from a virtual path proceeding thereover. For this purpose, the connection to be respectively separated has route information allocated to it with the assistance of a memory arrangement that is present in the respective line unit and is formed of a content-addressable memory (CAM) and of a following random access memory (RAM), the route information deviating from the route information of the virtual connections that continue to be carried in the corresponding virtual path.

3 Claims, 5 Drawing Sheets

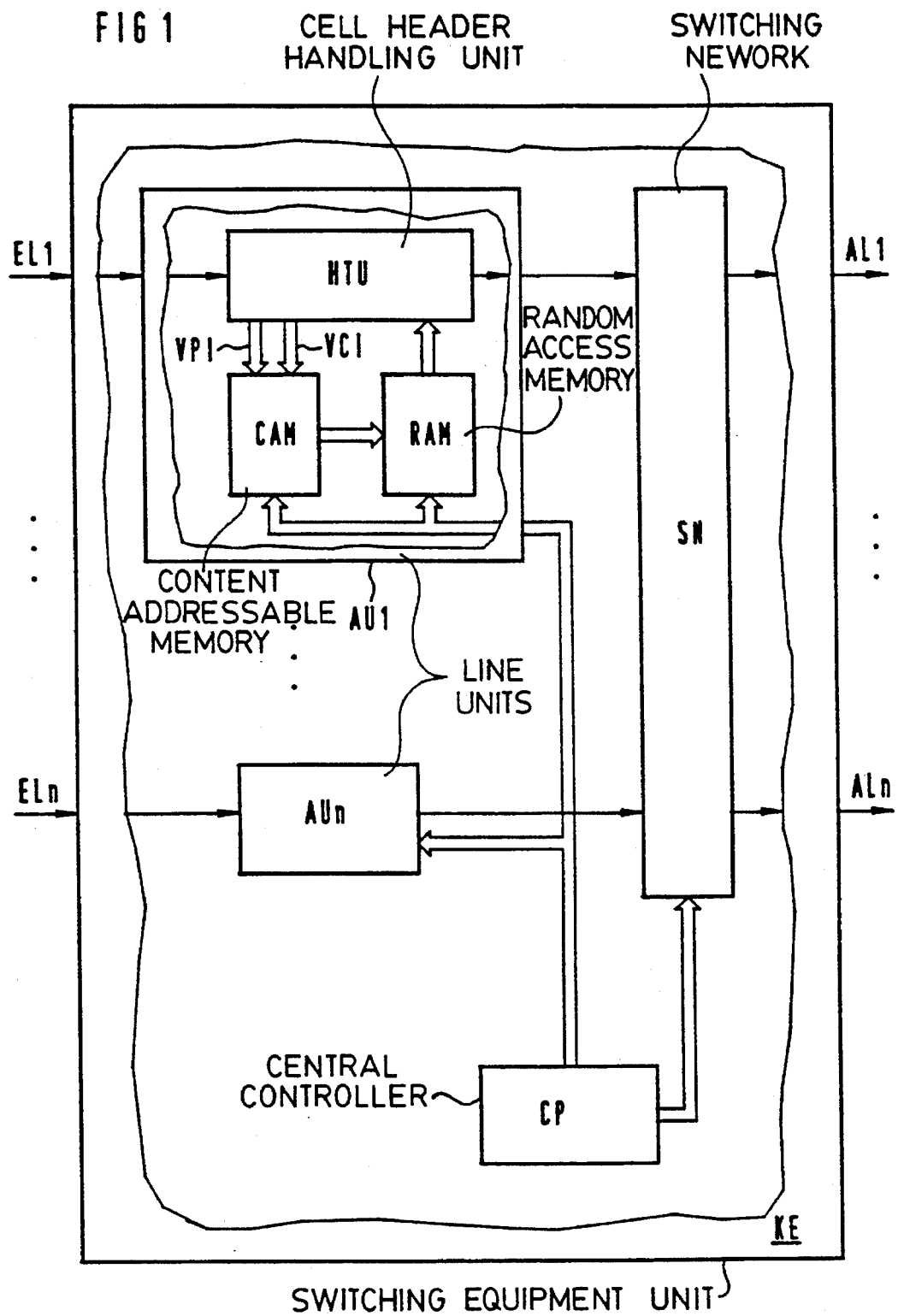

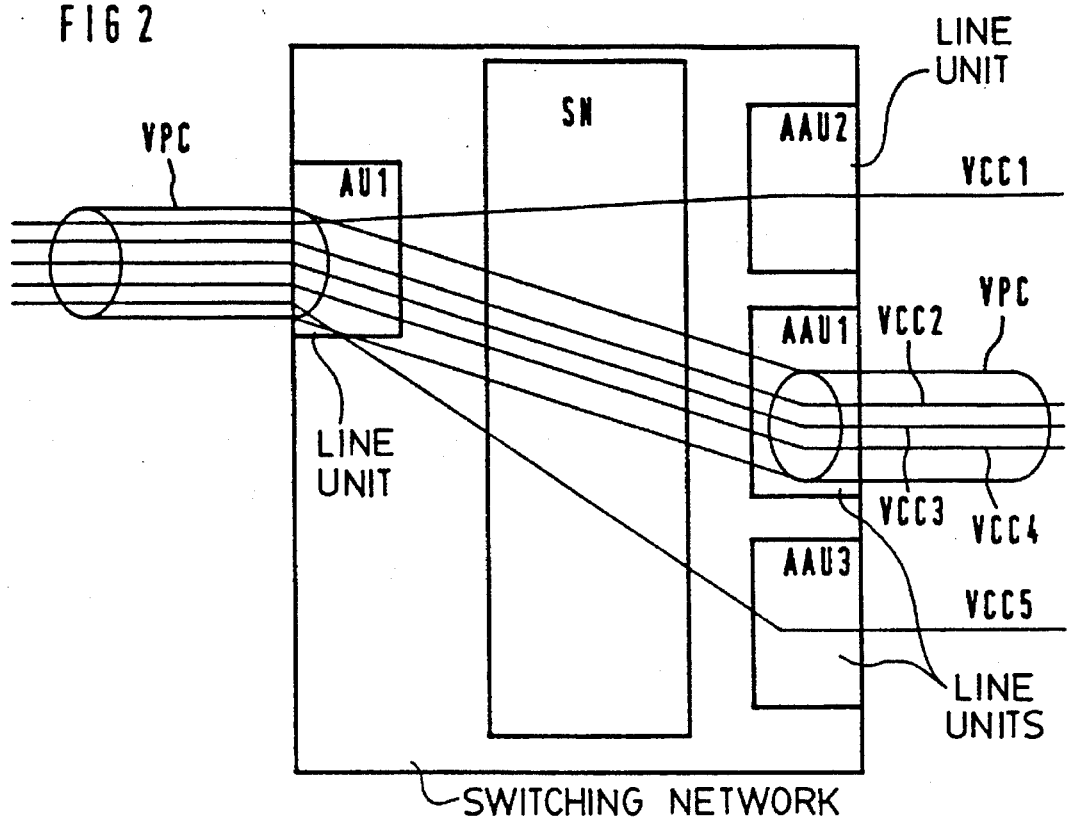
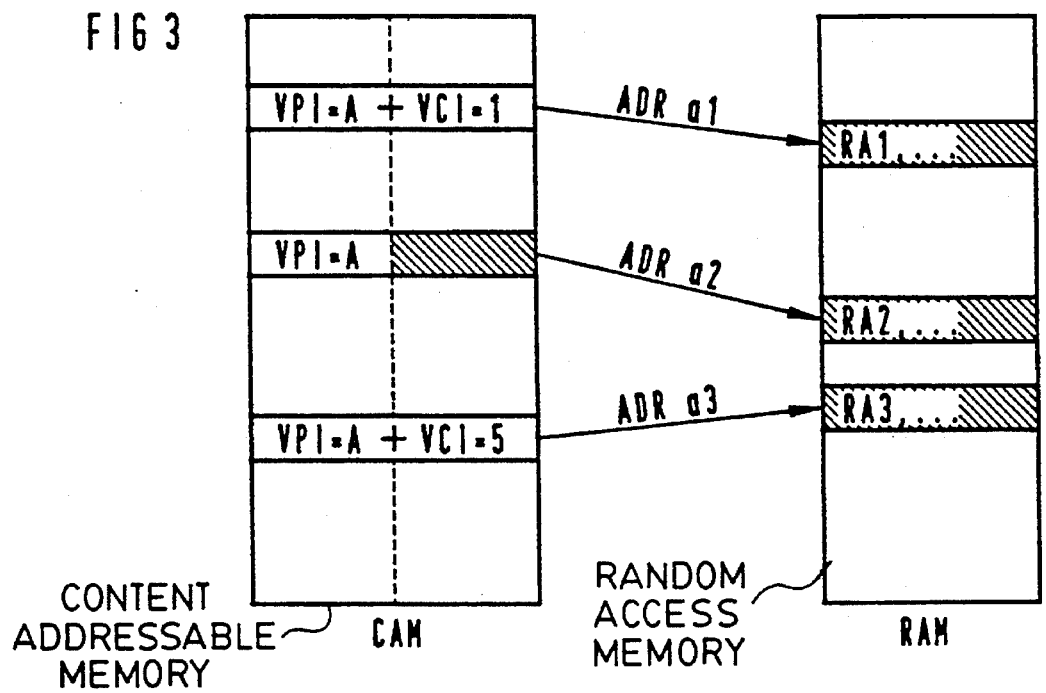

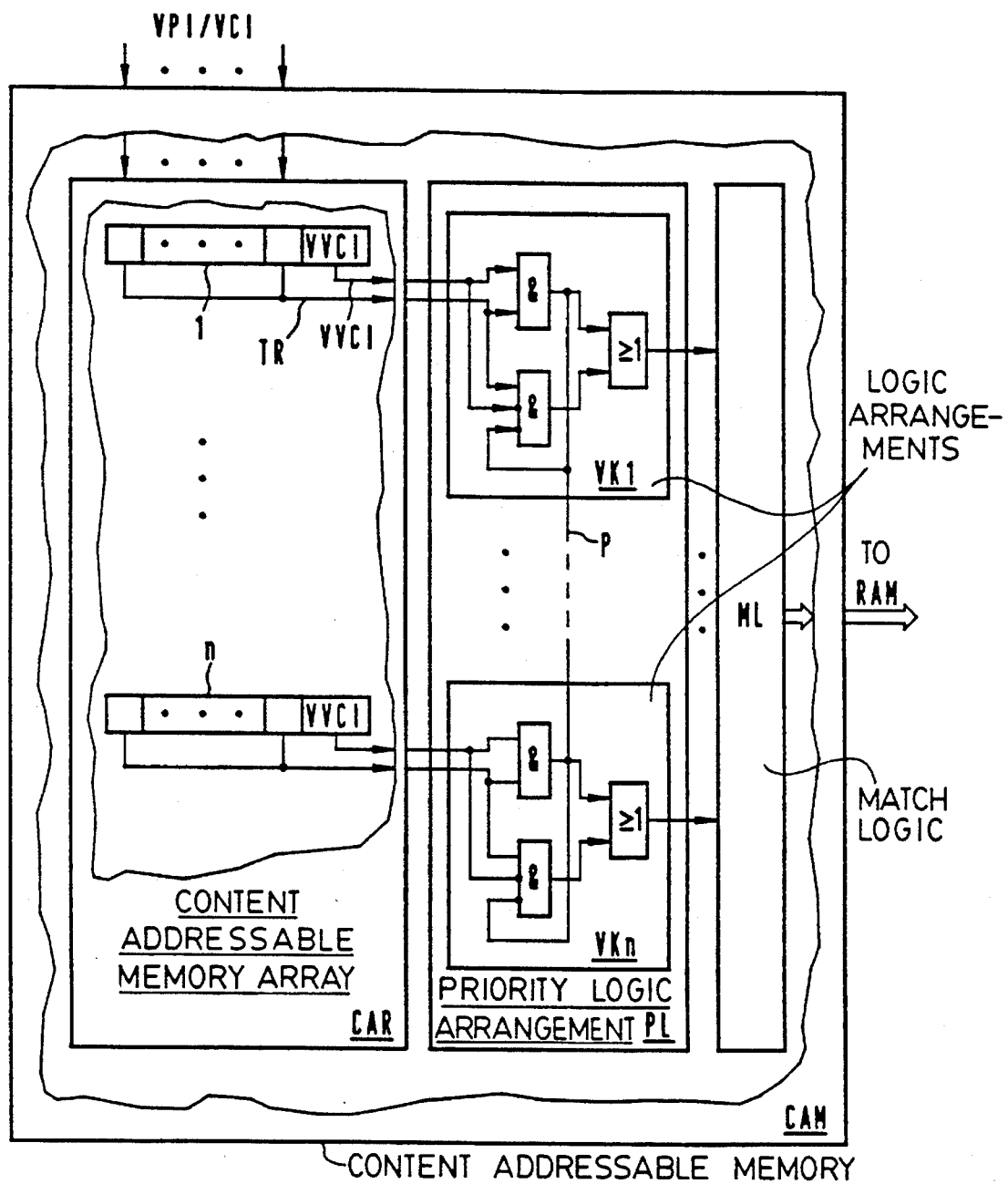

CIRCUIT ARRANGEMENT FOR LINE UNITS OF AN ATM SWITCHING EQUIPMENT

BACKGROUND OF THE INVENTION

The invention is directed to a circuit arrangement for line units of an ATM switching equipment unit operating according to an asynchronous transfer mode (ATM), and wherein the line units are respectively connected to input lines for supply of message cells thereto. Such a circuit arrangement has already been disclosed by European patent application EP 0 500 238 A1. It is stated therein that, among other things, a content-addressable memory is provided in a line unit. This memory is capable of being programmed such that a check for the conversion of logical addresses to physical addresses for hits is carried out only in view of the path identifier, only in view of the call identifier or in view of the path identifier and call identifier, without entering into the evaluation of the identifier information in greater detail for the purpose of a different handling of the virtual connections proceeding in virtual paths.

SUMMARY OF THE INVENTION

It is an object of the present invention to show a way how a circuit arrangement for line units of an ATM switching equipment unit can be designed in order to selectively allocate different memory addresses and, thus, selectively allocate different information stored in the write/read memory for the forwarding of the respective message cell to an identifier information supplied to the content-addressable memory.

According to the present invention, a circuit arrangement is provided for line units of a switching equipment unit working according to an asynchronous transfer mode (ATM) wherein the line units are respectively connected to input lines for supply of message cells that are respectively preceded by a cell header that carries identifier information composed of a path identifier and of a call identifier, so that the respective message cell is allocated to a specific virtual path and to a virtual connection preceding therein. The line units have a memory system comprising a content addressable memory (CAM) and a random access memory (RAM) following the CAM. The content addressable memory is input with identifier information of the cell header of the respective message cell. Given presence of a match with one of the stored identifier information items, the random access memory is supplied with a memory address corresponding to this match, and based on this criterion an information required for the forwarding of the respective message cell is offered proceeding from the random access memory. A path-associated identifier information having only an activated path identifier is uniformly allocated in the content addressable memory to the virtual connection proceeding in a virtual path. Additionally, a call-associated identifier information having an activated path identifier and call identifier for each virtual connection to be separated from the respective virtual path is stored in the content addressable memory together with a first marking information that prioritizes the call-associated identifier information over the corresponding path-associated identifier information. The content addressable memory is designed such that, given simultaneous presence of a match with a path-associated identifier information and a match with a call-associated identifier information prioritized by the first marking information, a first memory address allocated to the call-associated identifier information is offered; but, given presence of a match only with a path-associated identifier information, by contrast a second memory address allocated to the path-associated identifier information is offered.

The advantage of the invention is that, on the basis of a first prioritization of one or more identifier information items stored in the content-addressable memory, message cells of specific virtual connections of a virtual path can be branched therefrom, i.e. that the message cells of this connection or connections can be forwarded over a route deviating from the route defined for the virtual path. By contrast thereto, a uniform route is defined for the other connections of the virtual path.

According to a further development of the invention, a group-associated identifier information is uniformly allocated in the content addressable memory to the virtual paths proceeding in a path group prescribed by a defined plurality of more significant bits of a path identifier. Only the bits of the path identifier defining the path group are activated in the group-associated identifier information. Additionally, a path-associated identifier information with activated path identifier together with a second marking information that prioritizes the path-associated identifier information compared to the corresponding, group-associated identifier information and which is allocated to a lower priority compared to the first marking information, is stored in the content addressable memory for each virtual path to be separated from the respective path group. The content-addressable memory is designed such that, given simultaneous presence of a match with a group-associated identifier information and a match with a path-associated identifier information prioritized by the second marking information, a memory address allocated to the path-associated identifier information is offered; however, given presence of a match only with a group-associated identifier information, by contrast a memory address allocated to the group-associated identifier information in deviating from the memory address allocated to the path-associated identifier information is offered.

The advantage of the above described development is that, on the basis of a second prioritization undertaken alternatively to or in addition to the first prioritization, for one or more identifier information items stored in the content-addressable memory, specific virtual paths of a defined path group that is identified by a defined plurality of more significant bits of the corresponding path identifier can be branched off from this path group, and thus, can be forwarded via a route deviating from the route of the path group.

The present invention shall now be set forth in greater detail by way of example with reference to the drawing figures.

BRIEF DESCRIPTION OF THE DRAWINGS

FIG. 1 shows a block circuit diagram of a switching equipment unit wherein the invention is employed;

FIGS. 2 and 3 show a first example of the principle of the present invention;

FIG. 4 shows a possible structure of a content-addressable memory respectively present in the line units schematically shown in FIG. 1;

DESCRIPTION OF THE PREFERRED EMBODIMENTS

Figure 5:
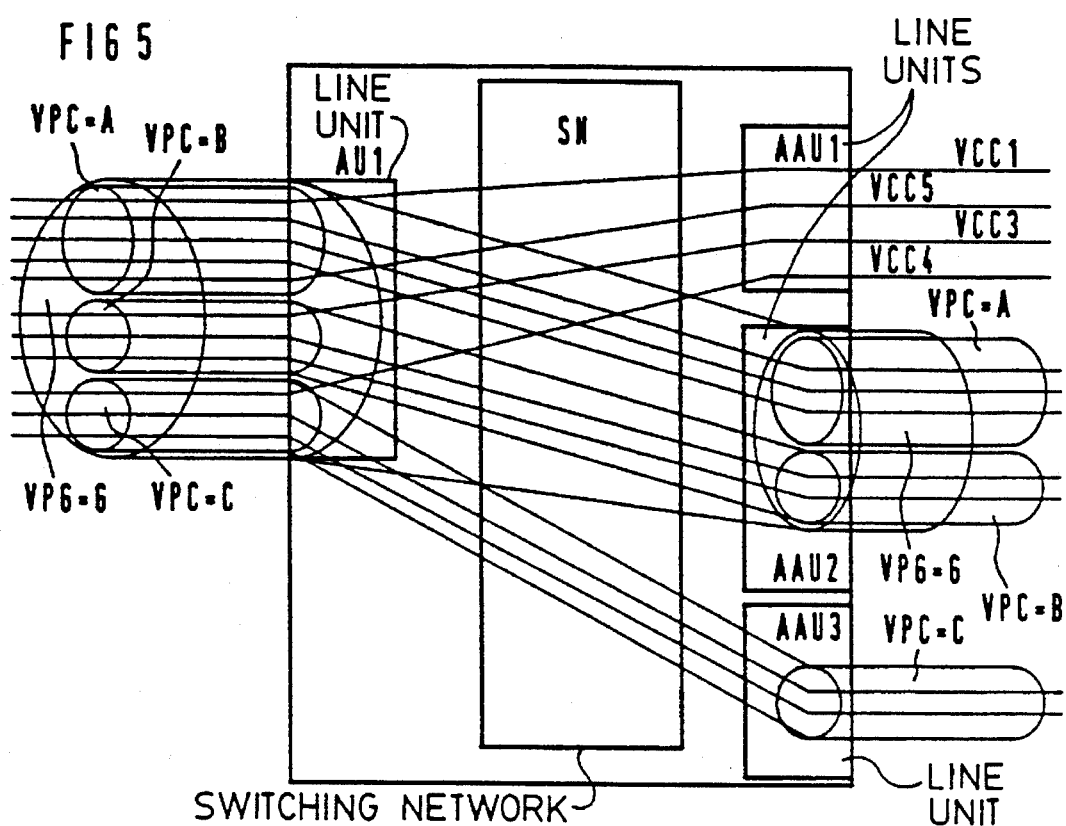
FIGS. 5 and 6 show a further example of the principle of the present invention.

FIG. 1 schematically shows a switching equipment unit KE working according to the asynchronous transfer mode (ATM) to which a plurality of input lines EL1–ELn as well as a plurality of output lines AL1–Aln are connected. Let these be subscriber lines or trunks to other switching equipment units. Message cells are transmitted over these input lines and output lines according to the asynchronous transfer mode, the message cells respectively having an external cell header as well as an information part that carries the useful information. Let an identifier information that is formed of a path identifier (VPI) identifying the respective virtual path and of a call identifier (VCI) identifying the virtual connection carried in this path be contained in the respective external cell header.

Each of the afore-mentioned input lines EL1–Eln has a separate line unit allocated to it. These line units are referenced AU1–AUn corresponding to their allocation to the input lines. Upon appearance of a message cell, the external cell header is evaluated by the respective line unit in view of, among other things, the identifier information contained therein. In the present exemplary embodiment, an internal cell header corresponding to this identifier information is offered wherein, among other things, a route information is contained with which the route through a switching network SN of the switching equipment unit KE connected to the line units is defined. This internal cell header precedes the respective message cell. This is also referred to as the "self-routing" principle. Alternatively thereto, however, the respective line unit can also merely convert the previous, external cell header of a message cell, i.e. can replace it by a new external cell header, this being known as what is referred to as the conversion principle. The internal or new external cell header relevant for the respective identifier information contained in an external cell header is thereby offered, for example, by a central controller CP that belongs to the switching equipment unit KE and also controls the switching network SN during the course of the setup of the respective virtual connection when the switching equipment unit KE is switched switching equipment unit or together with the setup of the respective virtual connection, in case the switching equipment unit KE is a matter of what is referred to as a "cross connect".

For the realization of the afore-mentioned functions, each of the line units AU1–AUn—as indicated for the line unit AU1—comprises a cell header handling unit HTU as well as a memory arrangement comprising a content addressable memory CAM and a write/read memory RAM connected thereto. Upon appearance of a message cell, the content addressable memory CAM is supplied with the afore-mentioned identifier information (VPI/VCI) contained therein and selects the corresponding write/read memory RAM with a memory address allocated thereto. Thereafter, this offers the cell header handling unit HTU and internal cell header stored in the memory location selected by the memory address or offers a new external cell header that is placed in front of the message cell present at the moment, or that replaces the previous external cell header.

As shown in FIG. 2, it is then provided in the present exemplary embodiment that specific connections can be branched off from the virtual connections carried in a virtual path, these connections being then forwarded via a route that deviates from the route defined for the virtual path. According to FIG. 2, a virtual path VPC to which the virtual connections VCC1–VCC5 belong proceeds over the line unit AU1. The virtual connections VCC2–VCC4 thereby continue to be carried in common within the virtual path VPC over the switching network SN and over a line unit AAU1 of the output side. By contrast thereto, the virtual connections VCC1 and VCC5 are branched off from the virtual path and are routed via the switching network SN and via a line unit AAU1 or AAU3 of the output side.

According to FIG. 3, let the path identifier VPI=A be assigned to the virtual path VPC, the call identifier VCI=1 be assigned to the virtual connection VCC1, and the call identifier VCI=5 be assigned to the virtual connection VCC5 in the assumed example. In order to then implement the afore-mentioned branching, three identifier information items are entered in three memory areas of the content-addressable memory CAM, namely the identifier information VPI=A+VCI=1 for the connection VCC1, the identifier information VPI=A+VCI=5 for the connection VCC5 and the identifier information VPI=A for the other connections VCC2, . . . , VCC4. A mark, for example in the form of a priority bit VVCI, is respectively allocated to the identifier information. A first logical level, for example the logical level "1" of this priority bit, indicates that the respective identifier information is completely valid, i.e. VPI+VCI. By contrast thereto, the second logical level, the logical level "0" of the priority bit VVCI, indicates that only the path identifier VPI of the respective identifier information is valid, i.e. the corresponding call identifier VCI is masked. The respectively corresponding priority bit VVCI is set to "1" for the identifier information of the connections VCCI and VCC5. By contrast thereto, the corresponding priority bit VVCI is set to "0" for the identifier information belonging to the other connections (VCC2, . . . , VCC4) in common.

Given the appearance of a message cell in the cell header handling unit HTU shown in FIG. 1, the identifier information (VPI and VCI) contained in the corresponding cell header is supplied to the corresponding content addressable memory CAM as a search word. In response thereto, this memory is searched for the presence of a corresponding, stored identifier information. When such an identical identifier information, and thus, a hit ("match") is present, then the memory address under which the identical identifier information was found is indicated as a result. Given the presence of a message cell of the connection VCCI, for example according to FIG. 3, thus, a memory address ADRa1 is offered, a memory address ADRa3 is offered given the presence of a message cell of the connection VCC5, and a memory address ADRa2 is offered given the presence of a message cell of the remaining connections VCC2, . . . , VCC4. The random access memory RAM (FIG. 1) that follows the content addressable memory CAM is then driven with these memory addresses. An afore-mentioned internal or new external cell header is thereby stored under the respective memory address, this being supplied to the cell header handling unit HTU in response to the drive.

In the afore-mentioned search of the content-addressable memory CAM for identifier information for the connections VCC1 and VCC5, a match with the identifier information stored for the other connections is additionally recognized since the call identifier part is masked therein. In order to suppress a multiple match resulting therefrom, the identifier information for the connection VCC1 or VCC5 is prioritized on the basis of the allocated priority bit VVCI. However, over the identifier information with masked call identifier parts stored for the other connections VCC2, . . . , VCC4. This prioritization thereby results in only the afore-mentioned address ARDa1 or ADRa3 being in fact offered for the connection VCC1 or VCC5. A possible embodiment of the content addressable memory CAM for the control of this prioritization shall be set forth below with reference to FIG. 4.

FIG. 4 shows a possible structure of the content-addressable memory CAM indicated in FIG. 1, whereby only the circuit parts required for an understanding of the present invention are shown. Accordingly, this content-addressable memory CAM comprises a CAM array CAR which has a plurality n of array lines available to it. Each of these array lines is formed of a plurality of cells that corresponds in number to the plurality of bit places of a search word. In the present exemplary embodiment, thus the plurality of cells of an array line corresponds to the plurality of bit places of an identifier information (VPI+VCI). The cells of an array line thereby serve for storing such an identifier information and are respectively composed of a memory cell with an integrated comparator. The respective comparator implements a bit comparison between a bit place of a search word supplied to the content-addressable memory CAM and a stored word, i.e. a supplied identifier information is compared bit-by-bit in the present exemplary embodiment to an identifier information stored in the respective array line. The respective comparator thereby indicates whether a coincidence, i.e. a match, is present in the corresponding bit place or not. The comparators of an array line, however, are changed with one another such that a match is indicated via a common match line TR, only given a coincidence in all bit places.

Over and above this, each of the array lines has a memory element belonging to it wherein the afore-mentioned priority bit VVCI is stored and that is connected to a control line VVCI.

The CAM array CAR is followed by a priority logic arrangement PL to which the common match line TR as well as the control line VVCI carrying the priority bit are individually supplied for the individual array lines. A match line and a control line of an array line are thereby supplied to a logic arrangement VK1, . . . ,VKn individually associated to a line or row. This logic arrangement is composed of a first AND element connected to these lines whose output is supplied to an input of an OR element. Beyond this, the outputs of the first AND elements of all logic arrangements VK1, . . . ,Vkn are connected to one another via a priority line P. In addition, each of the logic arrangements comprises a second AND element with three inputs, whereby two of these inputs are fashioned as inverting inputs. A first of these inverting inputs is connected to the priority line P, whereas the remaining inverting input is connected to the corresponding control line VVCI that carries the priority bit. At its output side, this second AND element is connected to a further input of the afore-mentioned OR element.

What is achieved by the logic arrangements VK1, . . . ,VKn connected to one another via the priority line P is that a match signal indicating a match is offered only at the output of the OR element of the logic arrangement coming into consideration given the presence of a match for a stored word with the priority bit VVCI=1, that is for a stored identifier information having VVCI=1 given the present exemplary embodiment. By contrast thereto, the other logic arrangements are driven via the priority line P such that a logic level deviating from the match signal appears at the output of the respectively corresponding OR element. In this way, the indication of an afore-mentioned multiple match is suppressed. When, by contrast, only one match having a priority bit VVCI=0 is present, then a match signal is indicated by the logic arrangement coming into consideration.

All logic arrangements VK1, . . . ,VKn are connected to a match logic ML via the respectively corresponding OR element. This match logic ML evaluates the level appearing at these OR elements and, given the presence of a match signal, outputs a memory address corresponding to this match signal to the random access memory RAM shown in FIG. 1. As mentioned above, this memory address corresponds to that memory address of the content addressable memory CAM under which the search word, the identifier information in this case, was found.

Figure 6:
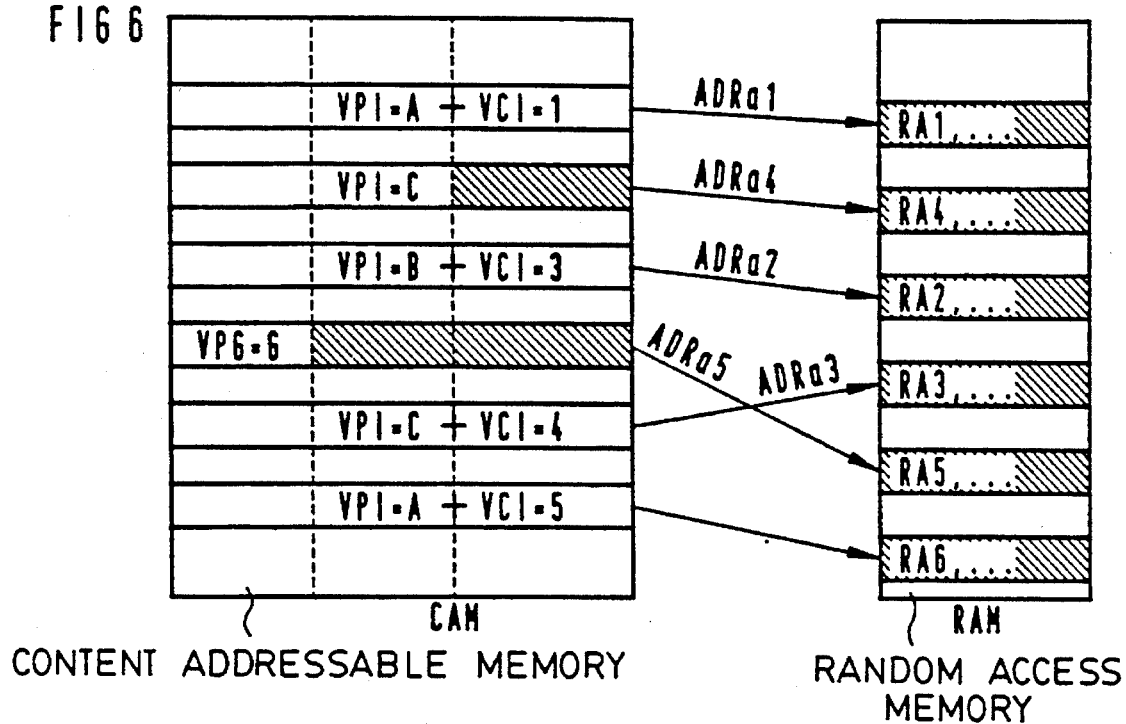

FIGS. 5 and 6 show an example where the virtual path VPC=C is separated from a path group VPG=G composed of the virtual paths VPC=A, VPC=B and VPC=C conducted via the line unit AU1 and, additionally the virtual connections VCI=1 and VCI=5 are separated from the virtual path VPC=A, the virtual connection VCI=3 is separated from the virtual path VPC=B, and the virtual connection VCI=4 is separated from the virtual path VPC=C. For this purpose, corresponding identifier information items are entered in the content addressable memory CAM, as already set forth with reference to FIG. 3. A sole difference compared to the example of FIG. 3 is that, in addition to the identifier information for the virtual path VPC=C to be separated and the virtual connections to be separated, an identifier information is provided in the content-addressable memory for the path group VPG=G to be forwarded in common. The corresponding call identifier part VCI in the identifier information for the virtual path VPI=C to be separated is masked by setting the corresponding priority bit VVCI=0. For the identifier information of the path group VPG=G, by contrast, both the corresponding call identifier part VCI as well as a part of the path identifier VPI are masked. It is thereby assumed that the path group VPG=G is defined by the more significant, non-masked bits of the path identifier. The masking for the path group thus occurs with the assistance of a further priority bit VVPG allocated to each of the array lines of the CAM array CAR shown in FIG. 4. Given, for example, a desired masking, this is set to VVPG=1.

In order to be able to properly undertake the separation assumed according to FIGS. 5 and 6, a control line VVPG carrying the priority bit VVPG is also supplied in addition to the match line TR and control line VVCI to the logic arrangements VK1, . . . ,VKn of the priority logic arrangement PL shown in FIG. 4 respectively proceeding from the allocated array line of the CAM array CAR. The logic arrangements respectively evaluate the priority bit VVCI=1 as having a higher priority compared to the priority bit VVPG=1. Given the presence of a match with the priority bit VVCI=1 (separation of an individual virtual connection), consequently a match signal is output by the respective logic arrangement to the match logic arrangement ML and, simultaneously, the output of match signals of the other logic arrangements is suppressed. In a corresponding way, a match signal is output only by the respective logic arrangement given the presence of a match with the priority bits VVCI=0 and VVPG=1, whereas the other logic arrangements are inhibited for the output of such a match signal.

Figure 7:
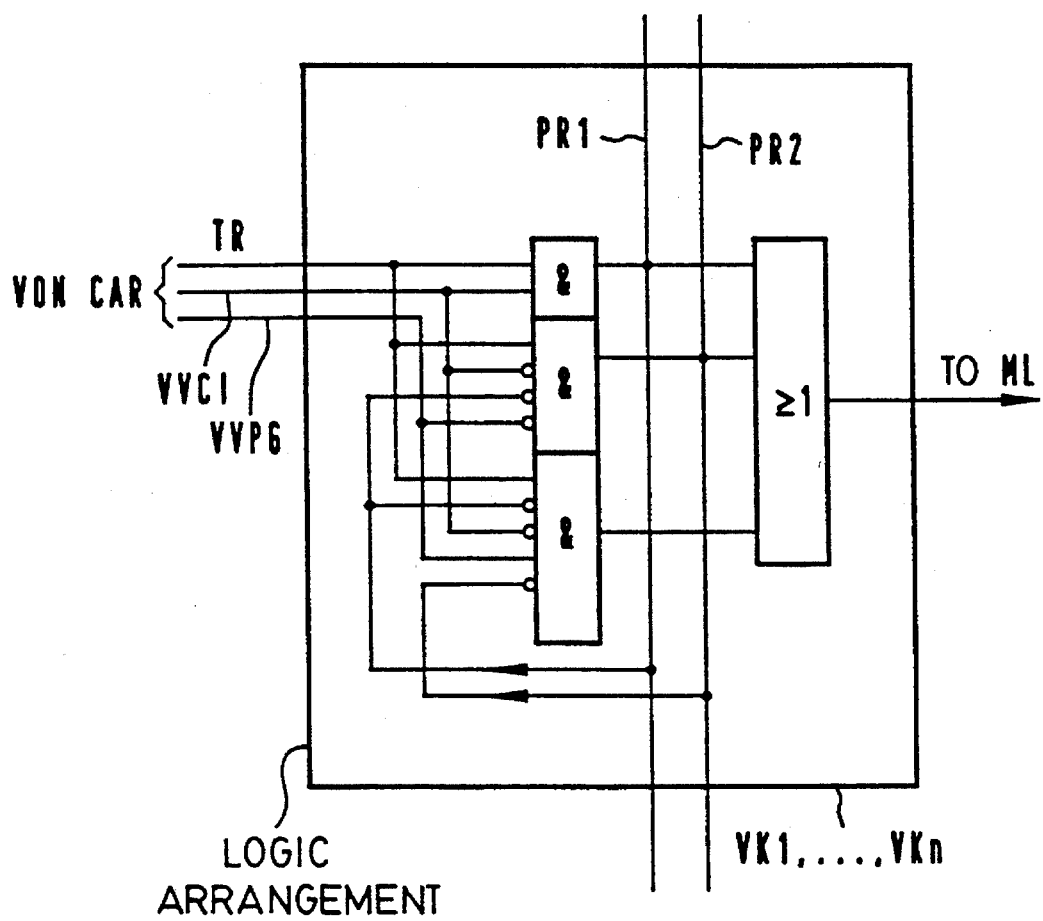
FIG. 7 shows a possible structure of a content-addressable memory in view of the example recited in FIGS. 5 and 6.

FIG. 7 shows a possible embodiment of the logic arrangements VK1, . . . ,VKn for the example set forth with reference to FIGS. 5 and 6. According thereto, each of the logic arrangements comprises three AND elements. A first of these AND elements has non-inverting inputs connected to the match line TR and to the control line VVCI, and has its output side connected via a priority line PR1 to the first AND elements of the remaining logic arrangements.

A second AND element of the respective logic arrangement is connected via a non-inverting input to the match line and is connected via three inverting inputs to the control line VVCI, to the priority line PR1, and to the control line VVPG. At its output side, this AND element is connected to a priority line PR2 in common with the second AND elements of the other logic arrangements.

The remaining third AND element of the respective logic arrangement is in communication via two non-inverting inputs to the match line TR and to the control line VVPG. Three inverting inputs, by contrast, are connected to the priority line PR1, to the priority line PR2, and to the control line VVCI.

Finally, the three AND elements of the respective logic arrangement have their respective output conducted to an OR element.

It was set forth above with reference to two examples how, on the basis of differently prioritized entries in the content addressable memory CAM, different memory addresses can be allocated to search information (identifier information) supplied thereto. Further nested or interlaced priorities for the individual entries can be defined by a corresponding definition of the entries in the content-addressable memory and a designing of the priority logic arrangement PL connected therewith. They are defined in order to achieve an allocation of search information supplied to the content-addressable memory to different memory addresses that goes beyond the examples.

Beyond this, let it also be pointed out that the above-explained logic operation functions of the logic arrangements VK1, . . . ,VKn can also be realized with the assistance of logic elements that deviate from the logic elements shown in FIGS. 4 and 7. Moreover, the priority logic arrangement PL can also be directly integrated in the match logic arrangement ML.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for line units of a switching equipment unit operating according to an asynchronous transfer mode, comprising:

said line units being respectively connected to input lines for supply of message cells that are respectively preceded by a cell header that carries identifier information items each formed of a path identifier and of a call identifier for allocating the respective message cell to a specific virtual path and to a virtual connection proceeding therein;

said line units having a memory system comprising a content addressable memory and a random access memory connected following the content addressable memory;

the content addressable memory being input with an identifier information item of the cell header of the respective message cell and, given presence of a match with one of the stored identifier information items, the random access memory being connected to be input with a memory address corresponding to this match and based on whose criterion an information required for forwarding of the respective message cell is offered proceeding from the random access memory;

path-associated identifier information having only an activated path identifier being uniformly allocated in the content addressable memory to the virtual connections proceeding in a virtual path;

a call-associated identifier information having an activated path identifier and a call identifier for each virtual connection to be separated from the respective virtual path and being stored in the content addressable memory together with a first marking information for prioritizing the call-associated identifier information over the corresponding path-associated path identifier information; and the content addressable memory being designed such that given simultaneous presence of a match with a path-associated identifier information and a match with a call-associated identifier information prioritized by the first marking information, a first memory address allocated to the call-associated identifier information is offered, but given presence of a match only with a path-associated identifier information, by contrast a second memory address allocated to the path-associated identifier information is offered.

2. A circuit arrangement according to claim 1, further comprising:

in the content addressable memory, a group-associated identifier information is uniformly allocated to the virtual paths proceeding in a path group prescribed by a defined plurality of more significant bits of a bit identifier, only bits of the path identifier defining the path group being activated in said group-associated identifier information;

a path-associated identifier information with activated path identifier together with a second marking information for prioritizing the path-associated identifier information compared to the corresponding, group-associated identifier information and which is allocated to a lower priority compared to the first marking information being stored in the content addressable memory for each virtual path to be separated from the respective path group; and the content addressable memory being designed such that, given simultaneous presence of a match with a group-associated identifier information and a match with a path-associated identifier information prioritized by the second marking information, a memory address allocated to the path-associated identifier information is offered, but given presence of a match only with a group-associated identifier information, by contrast a memory address allocated to the group-associated identifier information and deviating from the memory address allocated to the path-associated identifier information is offered.

3. A circuit arrangement according to claim 1 wherein an evaluation unit is provided in said content addressable memory such that, given simultaneous presence of matches with identifier information items of different priorities, only a match having a respectively higher priority is evaluated.

* * * * *